(12) United States Patent
Hazlewood et al.

(10) Patent No.: US 7,890,632 B2
(45) Date of Patent: Feb. 15, 2011

(54) LOAD BALANCING USING REPLICATION DELAY

(75) Inventors: Kristin Marie Hazlewood, Austin, TX (US); Yogesh Vilas Golwalkar, Maharashtra (IN); Magesh Rajamani, Pune, IN (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 12/128,066

(22) Filed: Aug. 11, 2008

(65) Prior Publication Data

US 2010/0036952 A1 Feb. 11, 2010

(51) Int. Cl.
| | |
|---|---|
| G06F 15/173 | (2006.01) |
| G06F 15/16 | (2006.01) |
| G06F 13/28 | (2006.01) |
| G06F 9/26 | (2006.01) |
| G06F 9/34 | (2006.01) |
| G06F 9/46 | (2006.01) |
| G01R 31/08 | (2006.01) |
| H04J 1/16 | (2006.01) |
| H04J 3/14 | (2006.01) |
| H04L 12/26 | (2006.01) |
| G06F 13/00 | (2006.01) |
| G06F 11/00 | (2006.01) |
| G08C 15/00 | (2006.01) |

(52) U.S. Cl. .................. 709/226; 709/218; 709/233; 709/241; 711/129; 711/207; 718/104; 718/105; 370/238

(58) Field of Classification Search ............... 709/203, 709/217–219, 226, 333, 241; 711/129, 207; 718/104, 105; 370/237, 238

See application file for complete search history.

(56) References Cited

U.S. PATENT DOCUMENTS

| | | | |
|---|---|---|---|
| 5,737,738 A | 4/1998 | Sharman | |
| 5,864,851 A | 1/1999 | Breitbart et al. | |
| 6,886,035 B2 * | 4/2005 | Wolff | 709/219 |
| 6,889,333 B2 | 5/2005 | Lawrence et al. | |
| 6,925,499 B1 * | 8/2005 | Chen et al. | 709/226 |
| 6,950,833 B2 * | 9/2005 | Costello et al. | 1/1 |
| 6,976,090 B2 * | 12/2005 | Ben-Shaul et al. | 709/246 |
| 7,054,935 B2 * | 5/2006 | Farber et al. | 709/226 |
| 7,062,567 B2 * | 6/2006 | Benitez et al. | 709/231 |
| 7,092,399 B1 * | 8/2006 | Cheriton | 370/401 |
| 7,103,185 B1 * | 9/2006 | Srivastava et al. | 380/277 |
| 7,363,346 B2 * | 4/2008 | Groner et al. | 709/214 |
| 7,383,436 B2 * | 6/2008 | Srivastava et al. | 713/163 |

(Continued)

*Primary Examiner*—Vivek Srivastava
*Assistant Examiner*—Melvin H Pollack
(74) *Attorney, Agent, or Firm*—Garg Law Firm, PLLC; Rakesh Garg; Jeffrey S. LaBaw

(57) ABSTRACT

A method, system, and computer usable program product for load balancing using replication delay are provided in the illustrative embodiments. In response to a request to update, a system updates data associated with a write server, forming updated data of a data partition. The system receives a read request for the data partition. The system calculates a time difference between an arrival time of the request to update and an arrival time of the read request. The system receives a set of average replication delays for a set of replica servers serving the data partition. The system directs the read request to a replica server in the set of replica servers whose average replication delay is less than or equal to the time difference.

18 Claims, 4 Drawing Sheets

U.S. PATENT DOCUMENTS

| | | | |
|---|---|---|---|
| 7,434,046 B1 * | 10/2008 | Srivastava | 713/163 |
| 7,509,645 B2 * | 3/2009 | Coates et al. | 718/105 |
| 7,512,673 B2 * | 3/2009 | Miloushev et al. | 709/221 |
| 7,620,630 B2 * | 11/2009 | Lloyd et al. | 1/1 |
| 7,624,169 B2 * | 11/2009 | Lisiecki et al. | 709/223 |
| 7,656,799 B2 * | 2/2010 | Samuels et al. | 370/231 |
| 7,657,581 B2 * | 2/2010 | Orenstein et al. | 705/51 |
| 7,743,147 B2 * | 6/2010 | Suorsa et al. | 709/226 |
| 7,779,010 B2 * | 8/2010 | McGarvey | 707/737 |
| 2004/0151035 A1 | 8/2004 | Lisi et al. | |
| 2006/0173956 A1 * | 8/2006 | Ulrich et al. | 709/203 |
| 2007/0260732 A1 * | 11/2007 | Koretz | 709/226 |
| 2008/0177839 A1 * | 7/2008 | Chang et al. | 709/205 |
| 2008/0209040 A1 * | 8/2008 | Rathi | 709/226 |
| 2008/0215750 A1 * | 9/2008 | Farber et al. | 709/233 |

* cited by examiner

LOAD BALANCING USING REPLICATION DELAY

BACKGROUND OF THE INVENTION

1. Field of the Invention

The present invention relates generally to an improved data processing system, and in particular, to a computer implemented method for managing a distributed data service. Still more particularly, the present invention relates to a computer implemented method, system, and computer usable program code for load balancing using replication delay.

2. Description of the Related Art

A directory is a hierarchical arrangement of information pertaining to users and systems in an organization. A directory server is a server in a data processing environment that serves a directory and provides a directory service. A directory service is a process by which a user in the data processing environment can retrieve details of a user or system from a directory server by providing a name of the user or system.

Directory servers may serve directories that are arranged according to a standard. One such standard is the lightweight directory access protocol (LDAP). LDAP specifies a particular way of hierarchically organizing user information in a directory. A directory may be implemented using a standard, a variation of the standard, or by using a proprietary hierarchy. For example, another standard for directories exists under the nomenclature X.500.

A directory may have parts that can be located on, or served by, different data processing systems. Such parts are called partitions. A partition contains a portion of the directory's data. In some instances, the entire directory may be a single partition.

A partition can be located on one or more data processing systems that can communicate with each other. Various partitions may be able to communicate with each other as well. A directory located across multiple data processing systems is called a distributed directory.

A user of a directory may be a human user, a software application, or a data processing system. In a distributed directory, a particular partition may contain the data that a user may request. In a data processing environment that includes a distributed directory, generally, a system manages the user requests so that the work load of responding to user requests with directory data does not overload a particular data processing system serving a partition of the directory.

Directory, directory partition, and distributed directory are specific examples of the more general concept of data partitioning and distributing data. A set of data processing systems including suitable software can serve any data in a similarly partitioned and distributed manner. For example, a website's content can be partitioned and distributed in this manner.

SUMMARY OF THE INVENTION

The illustrative embodiments provide a method, system, and computer usable program product for load balancing using replication delay. In response to a request to update, a system updates data associated with a write server, forming updated data of a data partition. The system receives a read request for the data partition. The system calculates a time difference between an arrival time of the request to update and an arrival time of the read request. The system receives a set of average replication delays for a set of replica servers serving the data partition. The system directs the read request to a replica server in the set of replica servers whose average replication delay is less than or equal to the time difference.

An application receives a replication delay information for a replica server for each request to update over a preset number of requests to update, over all requests to update received during a present amount of time, or a combination thereof. The application determines a replication delay for each request to update. The application computes an average replication delay from the replication delays for each request to update. The application sends the average replication delay for the replica server to a load balancing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
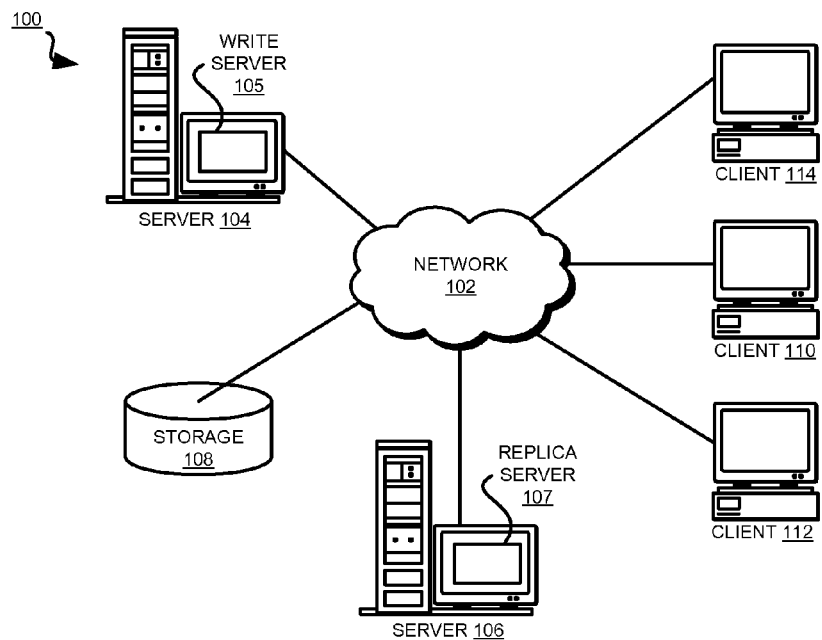
FIG. 1 depicts a pictorial representation of a network of data processing systems in which illustrative embodiments may be implemented.

A set of data processing systems may serve a directory partition. A set of data processing systems is more than one data processing system. A directory partition is said to be located on a data processing system when the data processing system is able to serve the data of that directory partition. For example, the data of the directory partition may be stored in the data processing system is local data storage, or may be accessible to the data processing system over a data network, such as from a network storage unit.

Typically, one data processing system in the set is the designated "write server". A write server is a data processing system with suitable software that modifies the data of the directory partition that the set of data processing systems are serving. Some examples of suitable software may be software implementations of an LDAP directory or an HTTP web server. Modifying the data of the directory is writing new data, changing stored data, manipulating stored data, or deleting stored data.

Other data processing systems in the set of data processing system with suitable software are designated as replica servers. A replica server serves a copy of the directory data of the partition. Arranged in this manner, the write server and each of the replica servers are able to serve the directory data but only one write server is able to modify the directory data.

Because the write server can modify the directory data, replica servers synchronize their copy of the directory data with the directory data of the write server. Replica servers may synchronize, or replicate, the data periodically or upon a trigger, such as when they receive a notice that the write server has modified its data. In some cases, the write server may deliver the updates to the replica servers to synchronize the replica servers' copies of the data with the updated data of the write server. By synchronizing the various copies of the data of the partition, all data processing systems serving the partition are expected to be able to serve the partition with consistent data.

However, illustrative embodiments recognize that a replica server may synchronize with the write server with some delay. This delay is the time elapsed between when modified data becomes available for serving from a write server and when a replica server copies the modified data to its data and makes the copy of the modified data available for serving from the replica server. This delay is the replication delay.

Illustrative embodiments further recognize that a replica server may synchronize with a replication delay that may be different from the replication delay of another replica server. Many factors may affect replication delay of a particular replica server under particular circumstances. For example, the larger the number of network devices the data has to cross between the write server and a particular replica server, the larger the replication delay is likely to be. As another example, replication delay for a replica server is likely to be larger when the data network is experiencing more than a threshold amount of traffic, as compared to the replication delay when the data network is experiencing less than the threshold amount of data traffic. As another example, the larger the amount of data that is to be replicated from a source, the larger the replication delay is likely to be.

Furthermore, illustrative embodiments recognize that in a given data processing environment, a replica server may replicate from another replica server instead of from a write server. In such a configuration, the first replica server may experience a replication delay in replicating from a write server. The second replica server may experience additional replication delay in replicating from the first replica server. In essence, the total replication delay of the second replica server may be the total of the two replication delays.

Illustrative embodiments further recognize that more than one write servers may be present in certain data processing environments. For example, one write server may receive a certain type of updates, whereas another write server may receive another type of updates. In such a configuration, a replica server's replication delay may be different when replicating from one write server or another.

Illustrative embodiments recognize that the replication delays of the various replica servers serving a partition may cause erroneous data to be returned in response to a user's request. For example, a user may send an update to the directory. A system may determine a partition to which the update pertains. The system may locate a write server for that partition and submit the update so that the directory data may be modified.

Continuing with the example, the user may then submit a request for directory data that is affected by the update. A system, such as a proxy server, using a load balancing algorithm, may select one of the replica servers to respond to the user's request. A load balancing algorithm is a method of choosing a server from many alternative servers to process a request. Round-robin algorithm is a well known load balancing algorithm used for selecting servers and services in this manner.

Returning to the example, if the selected replica server has not yet replicated the updated data from the write server, the replica server may return stale data and cause an erroneous result. In other words, illustrative embodiments recognize that if the user request arrives at a replica server within that replica server's replication delay, the replica server may return erroneous, out-of-date, or stale data in response.

To address these and other problems related to replicated data, the illustrative embodiments provide a method, system, and computer usable program product for load balancing using replication delay. The illustrative embodiments are described using a replicated directory partition only as an example for the clarity of the description. The illustrative embodiments are similarly applicable to any data processing environment where data is replicated across multiple data processing systems.

For example, where a website's content is served from many web servers, one web server may manage the writes and updates to the content, and other web servers may replicate and serve replicas of the content. The illustrative embodiments may be used in conjunction with this type of replicated data configuration.

Furthermore, a particular implementation may use the illustrative embodiments in conjunction with any application or any data processing system that uses replicated data, including but not limited to directory data or web content. For example, an implementation may use the illustrative embodiments with a directory server, a name server, a user location service server (ULS server), an application server, a web server, a proxy server, a mail server, a feed server, or any other type of data server. Another implementation may use the illustrative embodiments with a business application, enterprise software, and middleware application or platform.

Furthermore, an implementation may use the illustrative embodiments in conjunction with a variety of communication protocols, such as lightweight directory access protocol (LDAP), hypertext transport protocol (HTTP), and any other data communication protocol that may accommodate various aspects of the illustrative embodiments. Additionally, an implementation may implement the illustrative embodiments in conjunction with a hardware component, such as in a firmware, as embedded software in a hardware device, or in any other suitable hardware or software form.

Any advantages listed herein are only examples and are not limiting on the illustrative embodiments. A particular embodiment may have some, all, or none of the advantages listed above. Furthermore, specific embodiments may realize additional or different advantages. Such additional or different advantages are contemplated within the scope of the illustrative embodiments.

Figure 2:
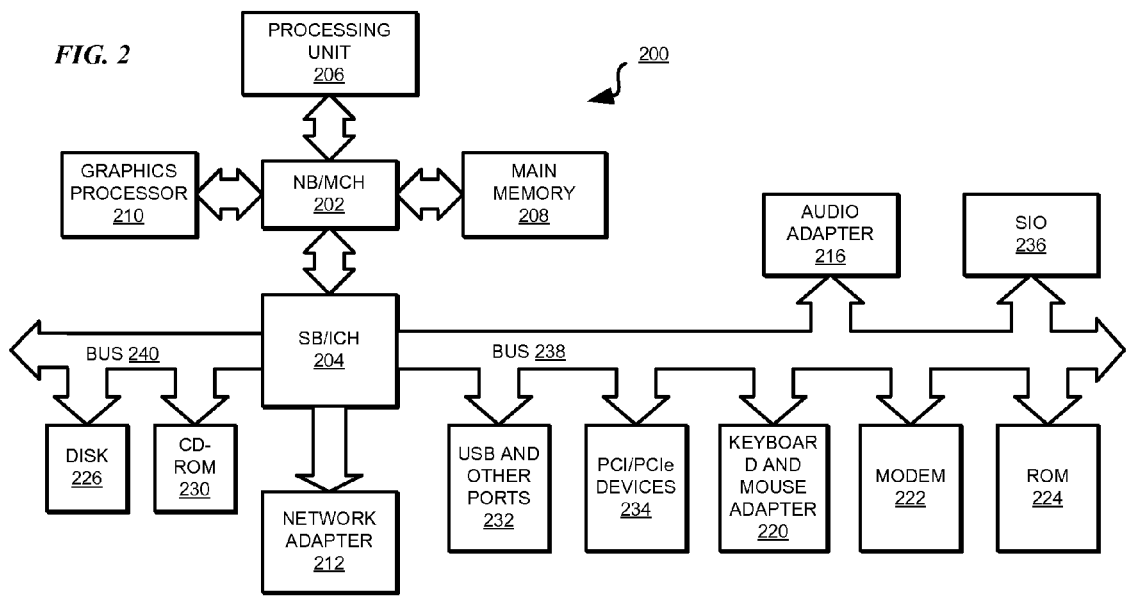
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. In the depicted example, server 104 includes write server 105, which may be an example of a software application, in conjunction with which the illustrative embodiments may be implemented. Similarly, server 106 may include replica server 107, which may be another example software application.

In addition, clients 110, 112, and 114 couple to network 102. Any of clients 110, 112, and 114 may have an application, typically a client application, executing thereon. As an example, client 112 is depicted to have browser 113 executing thereon. Browser 113 may be a commonly used web-browser.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SE/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
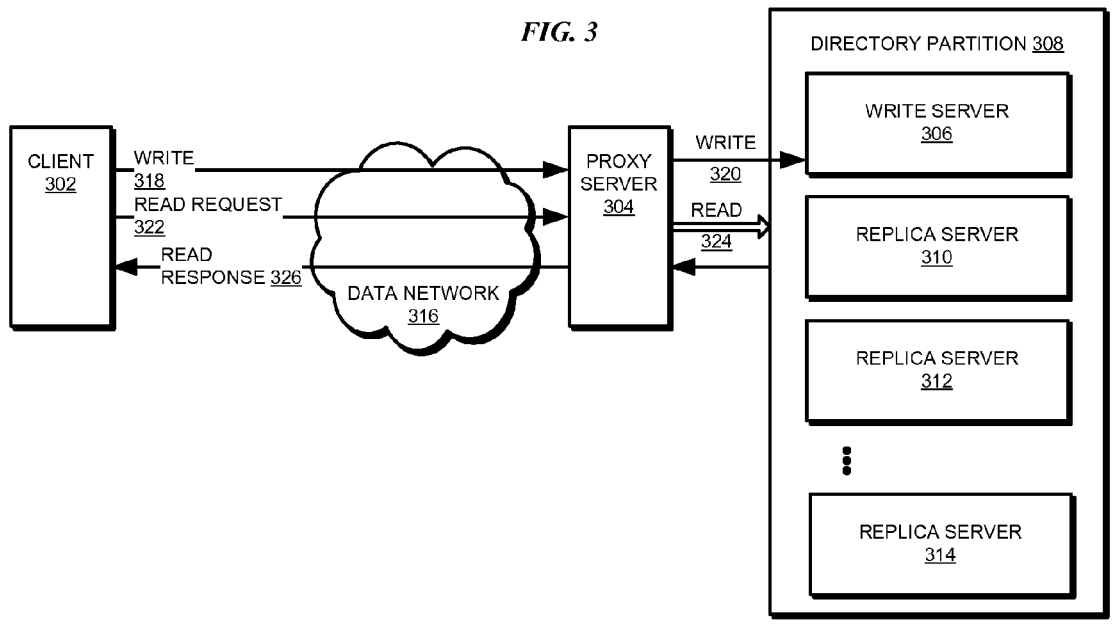
FIG. 3 depicts a block diagram of a directory environment in which the illustrative embodiments may be implemented.

With reference to FIG. 3, this figure depicts a block diagram of a directory environment in which the illustrative embodiments may be implemented. Client 302 may be implemented using client 110 in FIG. 1. Proxy server 304 may be a software application executing on a data processing system, such as a server similar to server 104 in FIG. 1.

Write server 306 may be a directory server serving directory partition 308 in the example depiction of this figure. In one embodiment, any data partition may be substituted for directory partition 308. Each of replica servers 310, 312, and 314 may be replica servers serving replicas of directory partition 308. Replica servers 310, 312, and 314 may replicate the partition data from write server 306 in the manner described above.

In operation, client 302 may communicate with directory partition 308 over data network 316. Client 302 may send write request 318, which may be to provide updated data to directory partition 308. Proxy server 304 may direct write request 318 as write request 320 to write server 306.

Write server 306 may modify the data pertaining to directory partition 308 that write server 306 may serve. Write server 306 may respond to write request 318, for example, with a confirmation or an acknowledgment response (not shown). Replica servers 310, 312, and 314 may replicate the modified data in the manner described above.

Client 302 may send read request 322. Proxy server 304 may determine that read request 322 pertains to directory partition 308 and direct read request 324 to directory partition 308. Using any available load balancing algorithm, proxy server 304 may select write server 306, or any of replica servers 310, 312, and 314 to respond to read request 324. The selected server serving directory partition 308 may respond to read request 322 with read response 326.

Figure 4:
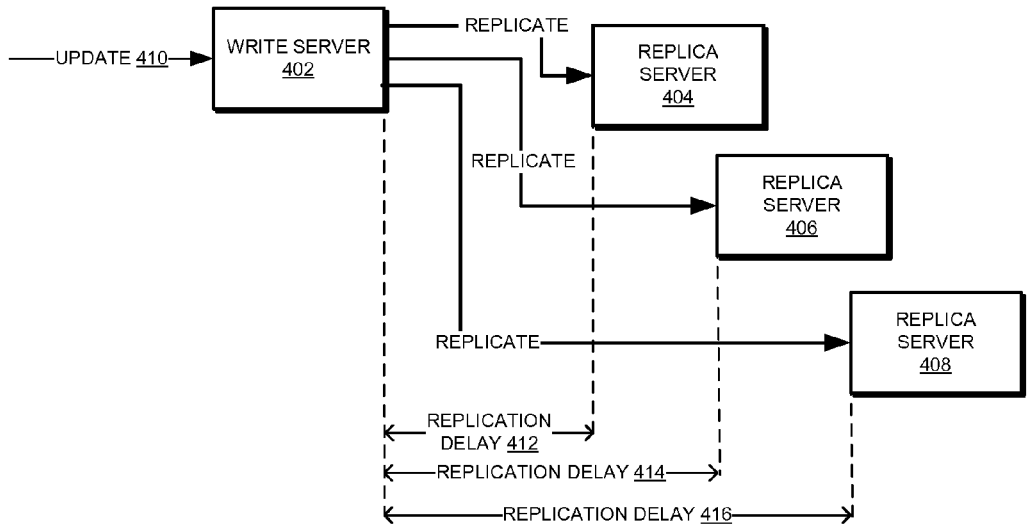
FIG. 4 depicts a block diagram of a replicated directory environment in accordance with an illustrative embodiment.

With reference to FIG. 4, this figure depicts a block diagram of a replicated directory environment in accordance with an illustrative embodiment. Write server 402 may be implemented using write server 306 in FIG. 3. Each of replica servers 404, 406, and 408 may be implemented using any of replica servers 310, 312, and 314 in FIG. 3.

As in the operation described with respect to FIG. 3, write server 402 may receive update 410. Write server 402 may modify the data according to update 410. Each of replica servers 404, 406, and 408 may replicate the modified data from write server 402.

As the illustrative embodiments recognize, replica server 404 may replicate the modified data after replication delay 412. Similarly, replica server 406 may replicate the modified data after replication delay 414. Replica server 408 may replicate the modified data after replication delay 416.

Replication delays 412, 414, and 416 may vary over time depending on the conditions existing in the data network between write server 402 and a replica server, amount of data being replicated, time of the day, resources available on their corresponding data processing systems, and many other factors. Furthermore, replication delays 412, 414, and 416 may vary from one instance of update 410 to another for the same replica server. For example, replication delay 412 may be 2 seconds for an instance of update 410 at 3 AM, and 5 seconds at 1 PM for another instance.

Additionally, replication delays 412, 414, and 416 may differ from one another for the same instance of update 410. For example, a particular instance of update 410 may cause replication delay 412 to be 3 seconds, replication delay 414 to be 8 seconds, and replication delay 416 to be 15 seconds.

If a proxy server, such as proxy server 304 in FIG. 3, receives a read request, the proxy server may direct the read request to write server 402, replica server 404, replica server 406, or replica server 408. Continuing with the above example, assume that for a particular update 410, replication delay 412 is 3 seconds, replication delay 414 is 8 seconds, and replication delay 416 is 15 seconds. Further assume that the read request relates to the data modified by update 410. If the read request arrives at the proxy server 5 seconds after update 410, and proxy server directs the read request to replica server 406, replica server 406 will respond with data that has not yet been updated from write server 402. In other words, as the illustrative embodiments recognize, replica server 406 may respond with old data before replicating the modifications from update 410.

Figure 5:
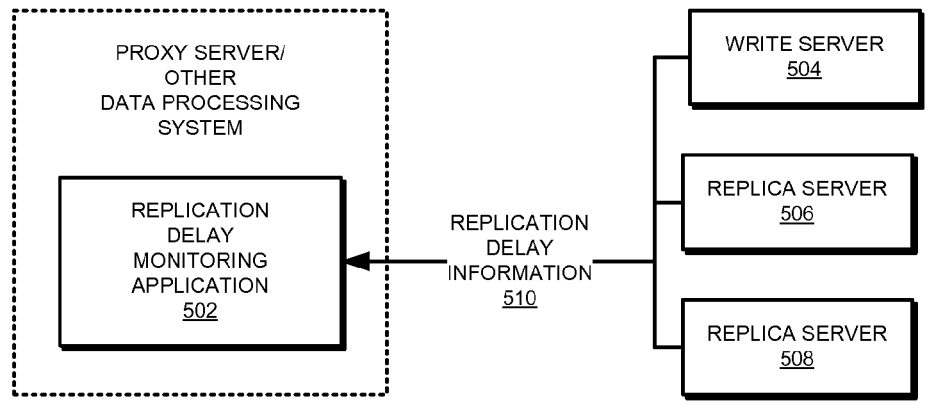
FIG. 5 depicts a block diagram of a system for load balancing using replication delay in accordance with an illustrative embodiment.

With reference to FIG. 5, this figure depicts a block diagram of a system for load balancing using replication delay in accordance with an illustrative embodiment. Replication delay monitoring application 502 may be a software application that may execute in conjunction with a proxy server or other data processing system in a data processing environment. In one embodiment, replication delay monitoring application 502 may execute within the proxy server or other similar system. In another embodiment, replication delay monitoring application 502 may be embedded within the code of a proxy server or other system usable for similar purpose, in accordance with the illustrative embodiments.

Write server 504 may be implemented using write server 402 in FIG. 4. Replica servers 506 and 508 may each be implemented using any of replica servers 404, 406, and 408 in FIG. 4.

Replication delay monitoring application 502 may collect replication delay information 510 about each of replica servers 506 and 508. Using replication delay information 510, replication delay monitoring application 502 may compute the replication delays for various replica servers.

For example, replication delay monitoring application 502 may compute a replication delay for replica server 506 by using a time at which an update was available from write server 504 and a time at which the update was available from replica server 506. In this example, the time information may be replication delay information 510. Replication delay monitoring application 502 may compute other replication delays for other replica servers in a similar manner. Of course, a particular implementation may use any method for computing the replication delay for a replica server without departing from the scope of the illustrative embodiments.

Furthermore, replication delay monitoring application 502 may compute several values of the various replication delays. For example, replication delay monitoring application 502 may compute replication delay for replica server 506 over a configurable number of updates, such as several of update 410 in FIG. 4. As another example, replication delay monitoring application 502 may compute replication delay for replica server 508 over any number of updates that occur over a configurable predetermined period.

Additionally, replication delay monitoring application 502 may re-compute the replication delays over a new predetermined period, or upon receiving a new update. In one embodiment, replication delay monitoring application 502 may periodically recomputed the replication delay values in the above described manner after the elapse of a predetermined time window. In another embodiment, replication delay monitoring application 502 may recomputed the replication delay values in the above described manner after receiving a predetermined number of new updates.

Replication delay monitoring application 502 may average the several replication delays it computes for a replica server and compute an average replication delay for the replica server. For example, replication delay monitoring application 502 may compute that replication delays for replica server 506 have been 2 seconds, 2 seconds, 3 seconds, 5 seconds, 4 seconds, and 2 seconds respectively for the last six updates. Replication delay monitoring application 502 may compute that the average replication delay for replica server 506 has been (2+2+3+5+4+2)/6=3 seconds over the last six updates.

As another example, replication delay monitoring application 502 may compute that replication delays for replica server 508 have been 3 seconds, 5 seconds, 5 seconds, and 3 seconds respectively for all updates received in the last eight hours. Replication delay monitoring application 502 may compute that the average replication delay for replica server 508 has been (3+5+5+3)/4=4 seconds over the last eight hours.

In one embodiment, replication delay monitoring application 502 may add a buffer time to the average replication delay to accommodate some variability in the replication circumstances. For example, in one implementation, replication delay monitoring application 502 may add twenty five percent of the computed average replication delay as buffer time to the computed average replication delay to create an average replication delay for a replica server. In another implementation, replication delay monitoring application 502 may add a predetermined amount of buffer time to the computed average replication delay to create an average replication delay for a replica server.

In one embodiment, a user, such as a system administrator may be able to adjust the buffer time amount or percentage based on the administrator's determination of the data processing environment conditions. In another embodiment, the amount or percentage of buffer time may be automatically adjusted depending on the conditions prevailing in the data processing environment.

A proxy server, such as proxy server 304 in FIG. 3, may use the set of average replication delays for the set of replica servers in directing the read request. A set of average replication delays is more than one average replication delay. A set of replica servers is more than one replica servers. Furthermore, the proxy server or another suitable system may receive a new set of average replication delays as replication delay monitoring application 502 re-computes the replication delay values over a new time window, or a new set of updates.

For example, the proxy server may receive a read request. The proxy server, replication delay monitoring application 502, or a combination thereof, may determine that the last update was made x units of time prior to receiving the read request. The proxy server may receive average replication delays for the various replica servers that can process the read request. Using replication delay monitoring application 502 provided average replication delays, the proxy server may select from only those replica servers whose average replication delay may be less than or equal to x units of time.

In a case where none of the replica servers may have an average replication delay of less than or equal to x units of time, the proxy server may send the read request to the write server for processing as only the write server may have the up-to-date information for responding to the read request. Thus, a proxy server or another comparable system performing load balancing in a distributed and replicated data processing environment may use replication delays in conjunction with a load balancing algorithm to direct requests to only the servers that may have the updated information.

Figure 6:
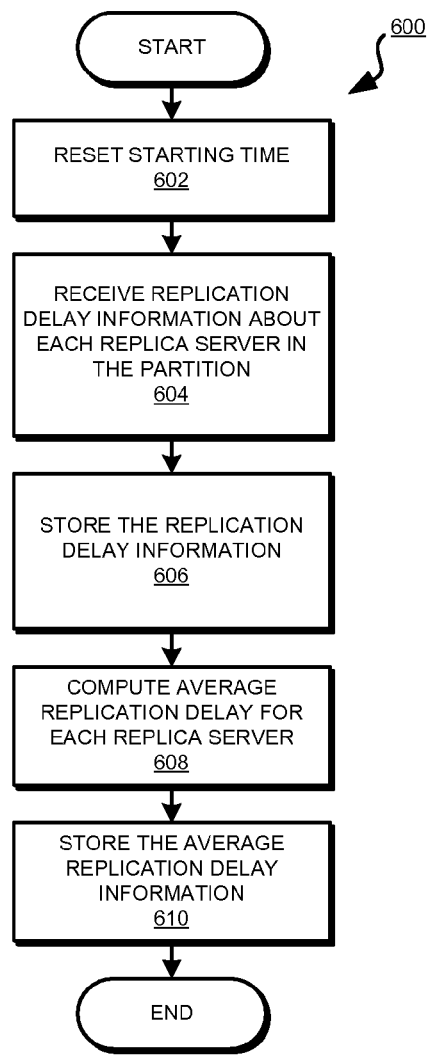
FIG. 6 depicts a flowchart of a process for computing average replication delays in accordance with an illustrative embodiment.

With reference to FIG. 6, this figure depicts a flowchart of a process for computing average replication delays in accordance with an illustrative embodiment. Process 600 may be implemented in a replication delay monitoring application, such as replication delay monitoring application 502 in FIG. 5.

Process 600 begins by resetting the starting time (step 602). Process 600 resets the starting to zero when an update arrives. For the clarity of the description, assume that an update is applied to the data of the write server as soon as the update arrives. In implementations where significant delays exist between the arrival of the update and the application of the update to the data of the write server, process 600 may reset the starting time to zero when the update is available for serving from the write server.

Process 600 receives replication delay information about each replica server (step 604). In one embodiment, step 604 may receive the information about only the replica servers serving a partition. In another embodiment, step 604 may receive the information about the replica servers serving multiple partitions.

Process 600 may store the replication delay information received in step 604 (step 606). An implementation may omit step 606 without departing from the scope of the illustrative embodiment.

Process 600 computes average replication delay for each replica server (step 608). Process 600 may perform this computation in the manner described above. Process 600 may store the average replication delays computed in this manner, such as for use by a proxy server (step 610). Process 600 ends thereafter.

Figure 7:
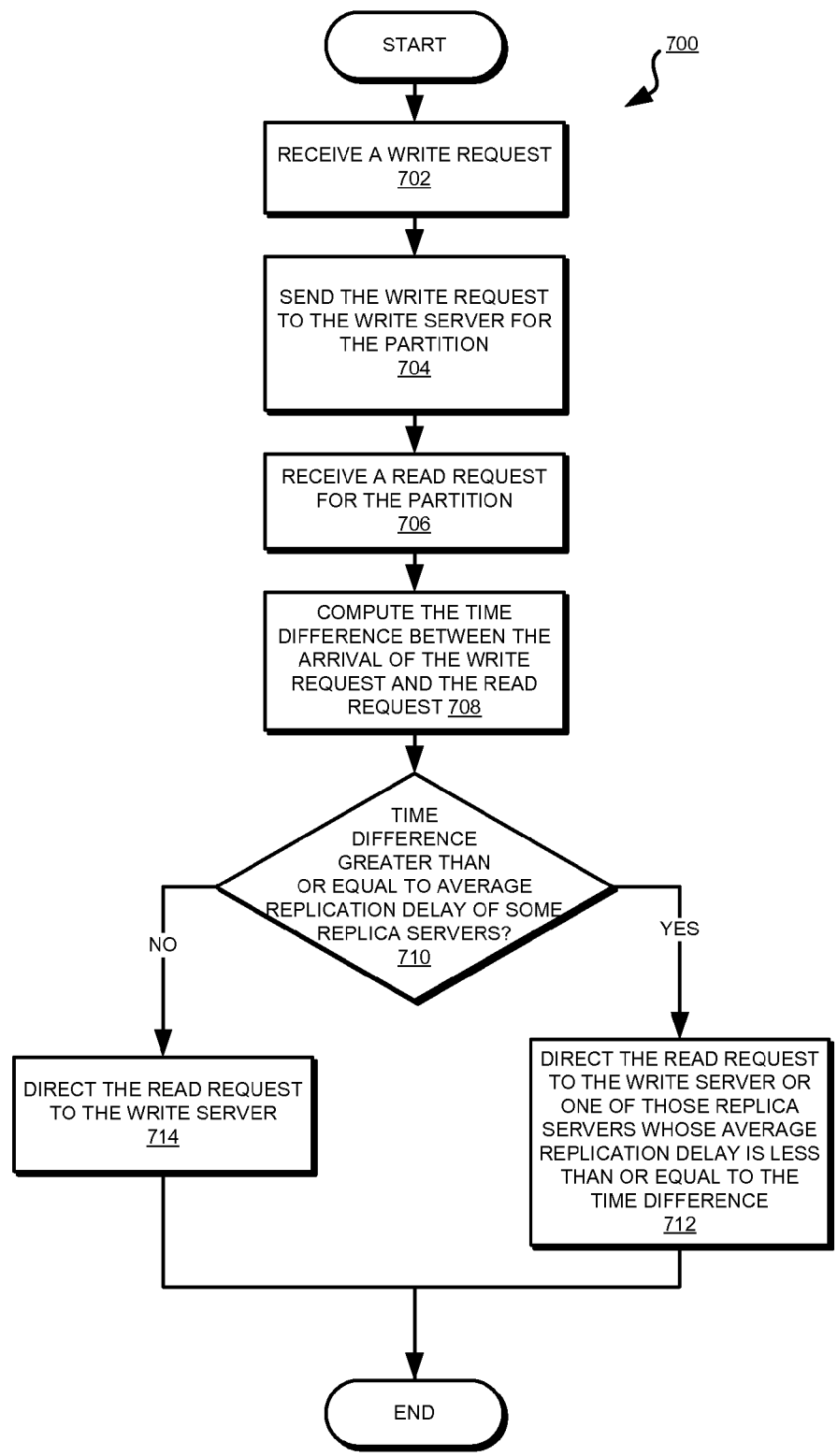
FIG. 7 depicts a flowchart of a process for load balancing using replication delay in accordance with an illustrative embodiment.

With reference to FIG. 7, this figure depicts a flowchart of a process for load balancing using replication delay in accordance with an illustrative embodiment. Process 700 may be implemented in a proxy server, such as proxy server 304 in FIG. 3, that may operate in conjunction with a replication delay monitoring application, such as replication delay monitoring application 502 in FIG. 5. Process 700 may also be implemented in any other load balancing system that may operate in conjunction with a replication delay monitoring application 502 in FIG. 5.

Process 700 begins by receiving a write request, such as update 410 in FIG. 4 (step 702). Process 700 may identify a partition to which the write request pertains, and sends the write request to a write server for the partition, such as write server 402 in FIG. 4 (step 704).

Process 700 receives a read request pertaining to the partition (step 706). Process 700 computes the time difference between the arrival of the write request and the arrival of the read request (step 708). Process 700 determines if the time difference is greater than or equal to the average replication delay of some replicas in the partition (step 710).

If process 700 determines that the time difference is greater than or equal to the average replication delay of some replica servers in the partition ("Yes" path of step 710), process 700 directs the read request to the write server or one of those replica servers whose average replication delay is less than or equal to the time difference (step 712). Process 700 ends thereafter.

If process 700 determines that the time difference is not greater than or equal to the average replication delay of some replica servers in the partition ("No" path of step 710), process 700 directs the read request to the write server (step 714). Process 700 ends thereafter.

The components in the block diagrams and the steps in the flowcharts and timing diagrams described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for load balancing using replication delays. A data source, such as data of a write server of a partition in a replicated environments may be updated from time to time. A replica server may experience a delay in replicating changes from the data source.

The illustrative embodiments describe a method for determining average replication delays for one or more replica servers in a partition. The illustrative embodiments may also add a buffer time to the average replication time for accommodating network uncertainties, variations in the size of the data update, fluctuations in the resources of a data processing system of a replica server, and other factors.

When a read request follows a write request, a proxy server or other load balancing system computes a time difference between the arrival of the two requests. The load balancing system receives the average replication delays of the various replica servers that can respond to the read request. The load balancing system selects a replica server whose replication delay is less than or equal to the time difference between the write and read requests. If no such replica server is available in the partition, the load balancing system may direct the read request to the write server.

Thus, the illustrative embodiments provide a method, system, and computer usable program product that may reduce or eliminate the occurrence of erroneous or old data being returned in response to read requests in a replicated environment. Illustrative embodiments are described using a replicated directory environment only as an example. The illustrative embodiments are usable in any environment where data or portions thereof are replicated and served from multiple servers.

The illustrative embodiments further allow for automatic elimination of the replica servers from load balancing consideration that may not be suitable for responding to a read request because of the replication delays. A replica server whose replication delay is greater than the time difference between the last write request and the present read request is not selected for responding to the present read request.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for load balancing using replication delay, the computer implemented method comprising:

updating, responsive to a request to update, a data associated with a write server, forming updated data of a data partition, wherein the data partition is a directory partition of a directory according to a directory protocol, wherein the write server and a set of replica servers are servers serving the directory partition;

receiving a read request for the data partition;
calculating a time difference between an arrival time of the request to update and an arrival time of the read request;
receiving a set of average replication delays for replica servers in the set of replica servers; and
directing the read request to a replica server in the set of replica servers whose average replication delay is one of (i) less than and (ii) equal to the time difference.

2. The computer implemented method of claim 1, further comprising:
replicating the updated data at the replica server from the data associated with the write server, wherein the replicating occurs after a replication delay.

3. The computer implemented method of claim 1, further comprising:
directing the read request to the write server if no replica server in the set of replica servers has an average replication delay of one of (i) less than and (ii) equal to the time difference.

4. The computer implemented method of claim 1, further comprising:
receiving a response to the read request from the replica server; and
sending the response, responsive to the read request.

5. A computer implemented method for load balancing using replication delay, the computer implemented method comprising:
receiving a replication delay information for a replica server for each request to update over one of (i) a preset number of requests to update and (ii) all requests to update received during a present amount of time, wherein the replica server is a server serving a directory partition of a directory according to a directory protocol;
determining a replication delay for each request to update;
computing an average replication delay from the replication delays for each request to update; and
sending the average replication delay for the replica server to a load balancing system.

6. The computer implemented method of claim 5, wherein the replication delay information comprises:
a first time when an update corresponding to a first request to update became available in a data source; and
a second time when the update became available for serving from the replica server.

7. The computer implemented method of claim 6, further comprising:
resetting a starting time for a replica server at the first time.

8. The computer implemented method of claim 5, further comprising:
adding additional time to the average replication delay, wherein the additional time is one of (i) a percentage of the average replication delay and (ii) a preset amount of time.

9. The computer implemented method of claim 5, further comprising:
storing the replication delay information; and
storing the average replication delay.

10. A data processing system for load balancing using replication delay, the data processing system comprising:
a storage device, wherein the storage device stores computer usable program code; and
a processor, wherein the processor executes the computer usable program code, and wherein the computer usable program code comprises:
computer usable code for updating, responsive to a request to update, a data associated with a write server, forming updated data of a data partition, wherein the data partition is a directory partition of a directory according to a directory protocol, wherein the write server and a set of replica servers are servers serving the directory partition;
computer usable code for receiving a read request for the data partition;
computer usable code for calculating a time difference between an arrival time of the request to update and an arrival time of the read request;
computer usable code for receiving a set of average replication delays for replica servers in the set of replica servers; and
computer usable code for directing the read request to a replica server in the set of replica servers whose average replication delay is one of (i) less than and (ii) equal to the time difference.

11. The computer implemented method of claim 10, further comprising:
computer usable code for replicating the updated data at the replica server from the data associated with the write server, wherein the replicating occurs after a replication delay.

12. The computer implemented method of claim 10, further comprising:
computer usable code for directing the read request to the write server if no replica server in the set of replica servers has an average replication delay of one of (i) less than and (ii) equal to the time difference.

13. The computer implemented method of claim 10, further comprising:
computer usable code for receiving a response to the read request from the replica server; and
computer usable code for sending the response, responsive to the read request.

14. A computer usable program product comprising a computer usable non-transitory storage medium including computer usable code for load balancing using replication delay, the computer usable code comprising:
computer usable code for receiving a replication delay information for a replica server for each request to update over one of (i) a preset number of requests to update and (ii) all requests to update received during a present amount of time, wherein the replica server is a server serving a directory partition of a directory according to a directory protocol;
computer usable code for determining a replication delay for each request to update;
computer usable code for computing an average replication delay from the replication delays for each request to update; and
computer usable code for sending the average replication delay for the replica server to a load balancing system.

15. The computer usable program product of claim 14, wherein the replication delay information comprises:
a first time when an update corresponding to a first request to update became available in a data source; and
a second time when the update became available for serving from the replica server.

16. The computer usable program product of claim 15, further comprising:
    computer usable code for resetting a starting time for a replica server at the first time.

17. The computer usable program product of claim 14, further comprising:
    computer usable code for adding additional time to the average replication delay, wherein the additional time is one of (i) a percentage of the average replication delay and (ii) a preset amount of time.

18. The computer usable program product of claim 14, further comprising:
    computer usable code for storing the replication delay information; and
    computer usable code for storing the average replication delay.

* * * * *